United States Patent [19]
Kitagawa et al.

[11] Patent Number: 5,581,317
[45] Date of Patent: Dec. 3, 1996

[54] VIBRATION PREVENTING DEVICE

[75] Inventors: Yoshihisa Kitagawa, Kashiwa; Tadao Kai; Yoshio Imura, both of Kawasaki; Akira Katayama, Koganei, all of Japan

[73] Assignee: Nikon Corporation, Tokyo, Japan

[21] Appl. No.: 604,259

[22] Filed: Feb. 21, 1996

Related U.S. Application Data

[63] Continuation of Ser. No. 272,583, Jul. 11, 1994, abandoned.

[30] Foreign Application Priority Data

Jul. 13, 1993 [JP] Japan ................. 5-195474

[51] Int. Cl.⁶ ............................................... G03B 1/18
[52] U.S. Cl. .................... 396/421; 359/813; 359/697; 359/700; 396/55
[58] Field of Search .................. 354/430, 70, 195.1, 354/195.12, 202; 359/554, 676, 695, 696, 699, 700, 813, 814, 819, 823, 824, 825, 677; 348/208

[56] References Cited

U.S. PATENT DOCUMENTS 5,172,276  12/1992  Ueyama et al. .................. 359/813
5,416,558   5/1995  Katayama et al. .............. 354/195.1 X

FOREIGN PATENT DOCUMENTS 6-289454  10/1994  Japan.

*Primary Examiner*—Howard B. Blankenship

[57] ABSTRACT

A vibration preventing device comprises a vibration preventing optical system movable for the prevention of vibration, a vibration preventing mechanism portion, a holding member for fixedly holding the vibration preventing optical system, and a frame member for mounting the holding member on the vibration preventing mechanism portion. The frame member and the holding member are separably coupled together.

3 Claims, 7 Drawing Sheets

VIBRATION PREVENTING DEVICE

This application is a continuation of application Ser. No. 08/272,583, filed Jul. 11, 1994, now abandoned.

BACKGROUND OF THE INVENTION

1. Field of the Invention

This invention relates to a vibration preventing device for preventing image vibration caused by hand shake or the like in a camera or the like.

2. Related Background Art

As a vibration preventing device of this kind, there is known a device in which during photographing, some lenses of a photo-taking lens (hereinafter referred to as the vibration preventing lens system) is moved in a direction substantially perpendicular to the optical axis thereof to prevent vibration caused by a camera being vibrated. Such a vibration preventing device has such structure as disclosed, for example, in Japanese Patent Application Laid-Open No. 3-110530 as a vibration preventing mechanism portion for making the vibration preventing lens system movable.

In this structure, a lens chamber for holding the vibration preventing lens and a lens frame for attaching the lens chamber to a driving mechanism portion have been integral with each other.

However, since in the prior-art vibration preventing device described above, the lens chamber and the lens frame are integral with each other, a mold must be made each time there is a change in the design or specification of the lens, and this has led to the problem of increased costs.

Also, if the lens chamber and the lens frame are simply made into parts independent on each other, there will arise another problem that fixing and positioning become difficult during assembly.

SUMMARY OF THE INVENTION

It is the object of the present invention is to provide a vibration preventing device which can cope with changes or the like in the design and specification of a lens and which can be easily fixed and positioned during assembly.

A first aspect of the present invention is a vibration preventing device which is provided with a vibration preventing optical system movable to prevent vibration, a vibration preventing mechanism portion for making said vibration preventing optical system movable, a holding member for holding said vibration preventing optical system, and a frame member for mounting said holding member on said vibration preventing mechanism portion and in which said holding member and said frame member are constructed by parts independent on each other and are separably coupled together.

A second aspect of the present invention is the vibration preventing device in which said frame member has an engagement portion engaged with an assembly jig to fix and/or position the latter.

A third aspect of the present invention is the vibration preventing device in which the base plate of said vibration preventing mechanism portion has an engagement portion engaged with an assembly jig to fix and/or position the latter.

According to the present invention, the optical system holding member and the frame member are discrete parts and can be coupled together and therefore, where there are changes or the like in the design and specification of the lens, coping with other types of device becomes possible by only a change of one part.

Also, the frame member or the base plate of the vibration preventing mechanism portion has its engagement portion engaged with the assembly jig during assembly and therefore, fixing or positioning can be accomplished easily and highly accurate assembly is possible.

DESCRIPTION OF THE PREFERRED EMBODIMENTS

Figure 1:
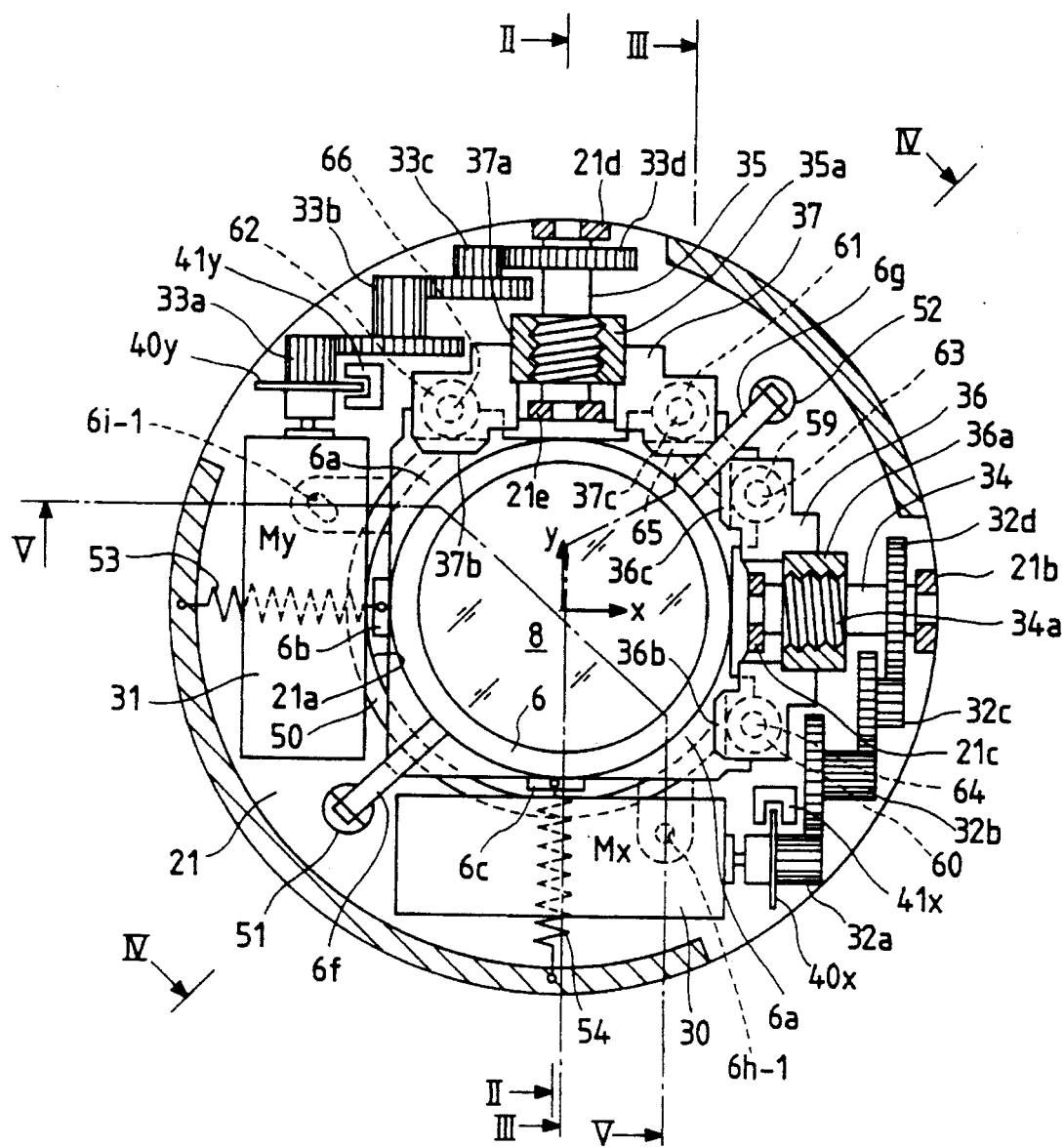
FIG. 1 is a cross-sectional view showing the essential portions of a first embodiment of the vibration preventing device of the present invention.
Figure 2:
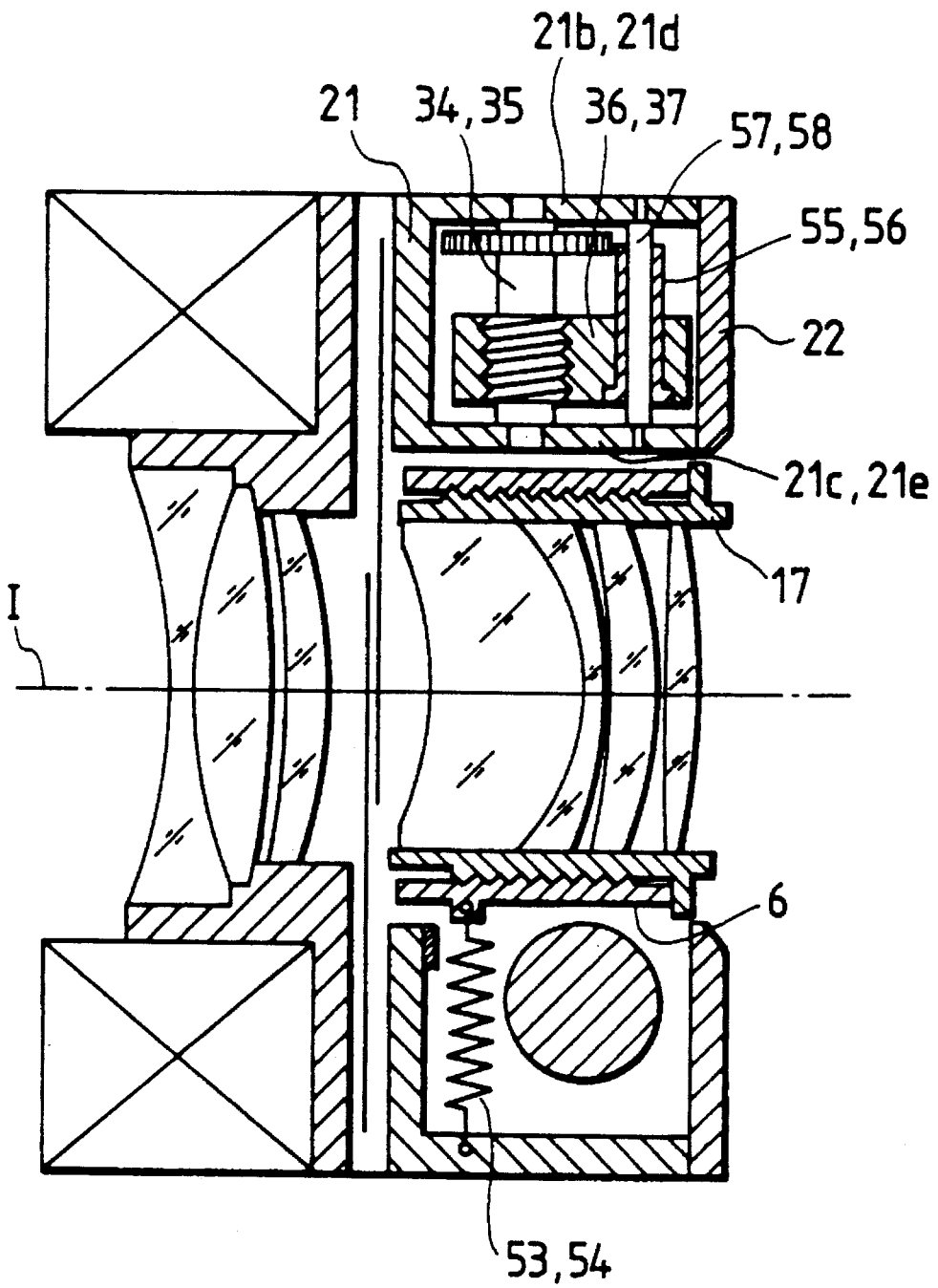
FIG. 2 is a cross-sectional view taken along the line II—II of FIG. 1.

The invention will hereinafter be described in greater detail with respect to some embodiments thereof shown in the drawings.

FIGS. 1 to 7 show a first embodiment of the vibration preventing device of the present invention. The schematic construction of a camera having a photo-taking lens system with a lens shutter to which the present invention can be suitably applied will first be described briefly with reference to FIG. 6.

In the camera 1, a photo-taking lens system 2 is constructed as a zoom lens comprising a first lens group 4, a second lens group 9 and a third lens group 11. The first lens group 4 is constituted by three lenses 4a, 4b and 4c being held in a lens chamber 3. The second lens group 9 is comprised of seven lenses in total, i.e., fore and rear lens groups 7 and 8 comprising three lenses 7a, 7b, 7c and four lenses 8a, 8b, 8c, 8d, respectively, held in lens chamber members 5 and 17, respectively. The lens chamber member 17 is threadedly engaged with a lens frame 6. The third lens group 11 is constituted by three lenses 11a, 11b and 11c being held by a lens frame 10.

A lens shutter 12 is interposed between the fore and rear lens groups 7 and 8 of the above-described second lens group 9, and is comprised of shutter curtains 13 and 14 and a driving portion 15 for driving the same. This driving portion 15 is disposed on the outer peripheral portion of the lens frame of the fore lens group 7, and the shutter curtains 13 and 14 are disposed immediately in front of the rear lens group 8 which functions as an image vibration preventing lens to be described.

Figure 6:
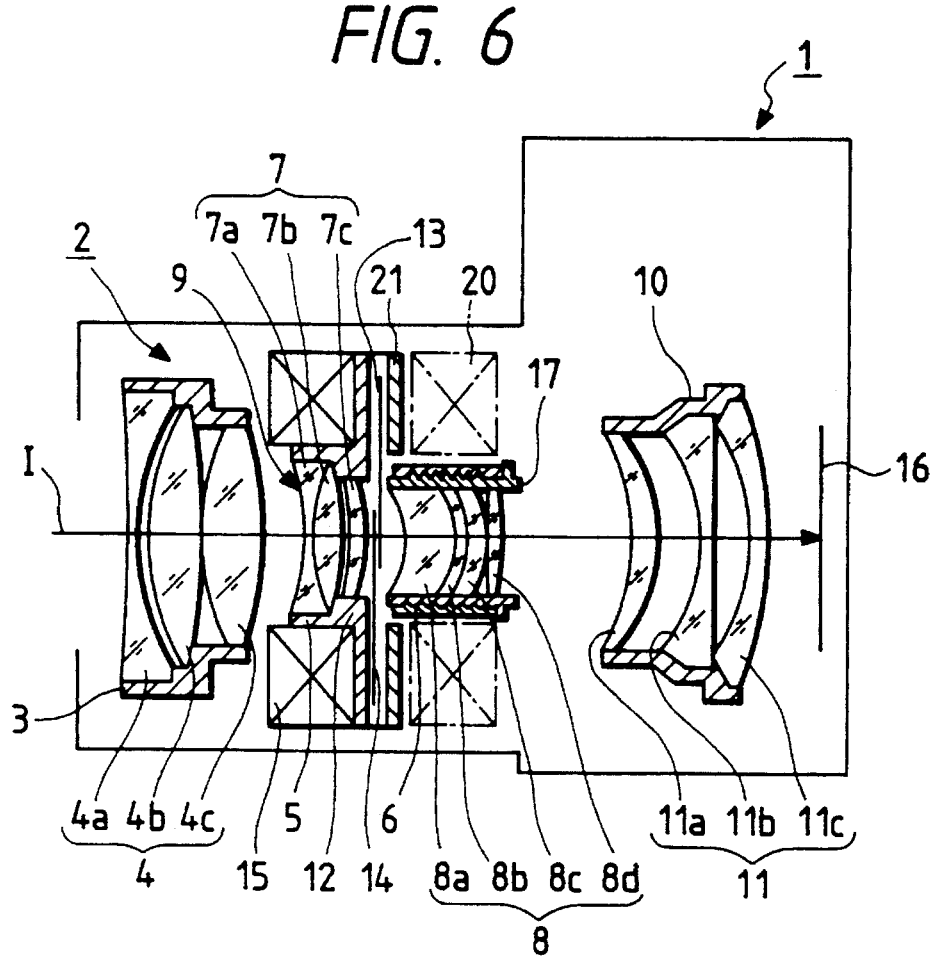
FIG. 6 schematically shows the construction of a camera with a lens shutter in which an embodiment of the vibration preventing device of the present invention can be suitably used.

An imaging plane 16 is a plane in which is disposed film on which the image of an object is formed by the first, second and third lens groups 4, 9 and 11 constituting the above-described photo-taking lens system 2. In FIG. 6, the reference character I designates the optical axis of the photo-taking lens system 2.

In this embodiment, in the photo-taking lens system 2 having the three lens groups 4, 9 and 11 as described above, the rear lens group 8 in the second lens group 9 is shifted as an image vibration preventing lens in a direction orthogonal to the optical axis I, whereby an image formed on the imaging plane 16 is moved in conformity with an image vibration state by the use of an image vibration preventing mechanism portion 20 as shown in FIGS. 1 to 4. This image vibration preventing mechanism portion 20, as shown in FIGS. 2, 3, 4 and 6, is provided in the space around the outer periphery of the rear lens group 8 in the second lens group 9.

The image vibration preventing mechanism portion 20 will now be described with reference to FIGS. 1 to 4. The rear lens group 8 (hereinafter referred to as the vibration preventing lens 8) in the second lens group 9 is fixedly held in the lens frame 6. The lens frame 6 has springs 51 and 52 extended between arm portions 6f, 6g provided on a portion of the lens frame 6 and a base plate 21, and a flange portion 6a provided on the outer peripheral portion of the lens frame 6 normally bears against a sliding member 50 (see FIG. 4) fixed around an opening 21a in the base plate 21.

The sliding member 50 is formed of a material having a low frictional characteristic such as Teflon, fluorine contained resin or phosphor bronze, or a member subjected to surface treatment so as to have a low frictional characteristic. Thus, the vibration preventing lens 8 is movable at a low load in a plane perpendicular to the optical axis I and moreover is biased by the springs 51 and 52 and therefore, it will never incline to deteriorate the optical performance.

DC motors 30 and 31 for x-axis and y-axis, respectively, are drive devices for moving the image vibration preventing lens 8 in x-axis direction and y-axis direction (in FIG. 1, they are given Mx and My). Gear trains 32 and 33 are rotation transmitting gear trains comprising gears 32a, 32b, 32c, 32d and gears 33a, 33b, 33c, 33d, respectively, for transmitting drive forces from the motors 30 and 31, and the rotation of these gear trains is transmitted to a first or second shaft 34 or 35. The first and second shafts 34 and 35 extend in x-axis direction or y-axis direction and are rotatably supported on bearing portions 21b and 21c or 21d and 21c provided on the base plate 21.

The above-described motors 30 and 31 are fixed to the base plate 21 side, and the gears 32a, 32b, 32c and 33a, 33b, 33c constituting the gear trains 32 and 33, respectively, are rotatably fixed on the base plate 21 and the final gears 32d and 33d are rotatable with the shafts 34 and 35, respectively.

As regards movable members 36 and 37 on x-axis side and y-axis side respectively, internally threaded portions 36a and 37a provided thereon are engaged with the externally threaded portions 34a and 35a, respectively, of the shafts 34 and 35. Guide members 55 and 56 are fixed to the movable members 36 and 37, respectively, adjacent to their internally threaded portions 36a and 37a. These guide members 55 and 56 are guided by guide shafts 57 and 58, respectively fixed to the bearing portions 21b and 21d or 21c and 21e of the base plate 21 in parallelism to the shafts 34 and 35. Accordingly, the movable members 36 and 37 are moved in x-axis direction and y-axis direction, respectively, by the motors 30 and 31.

Figure 3:
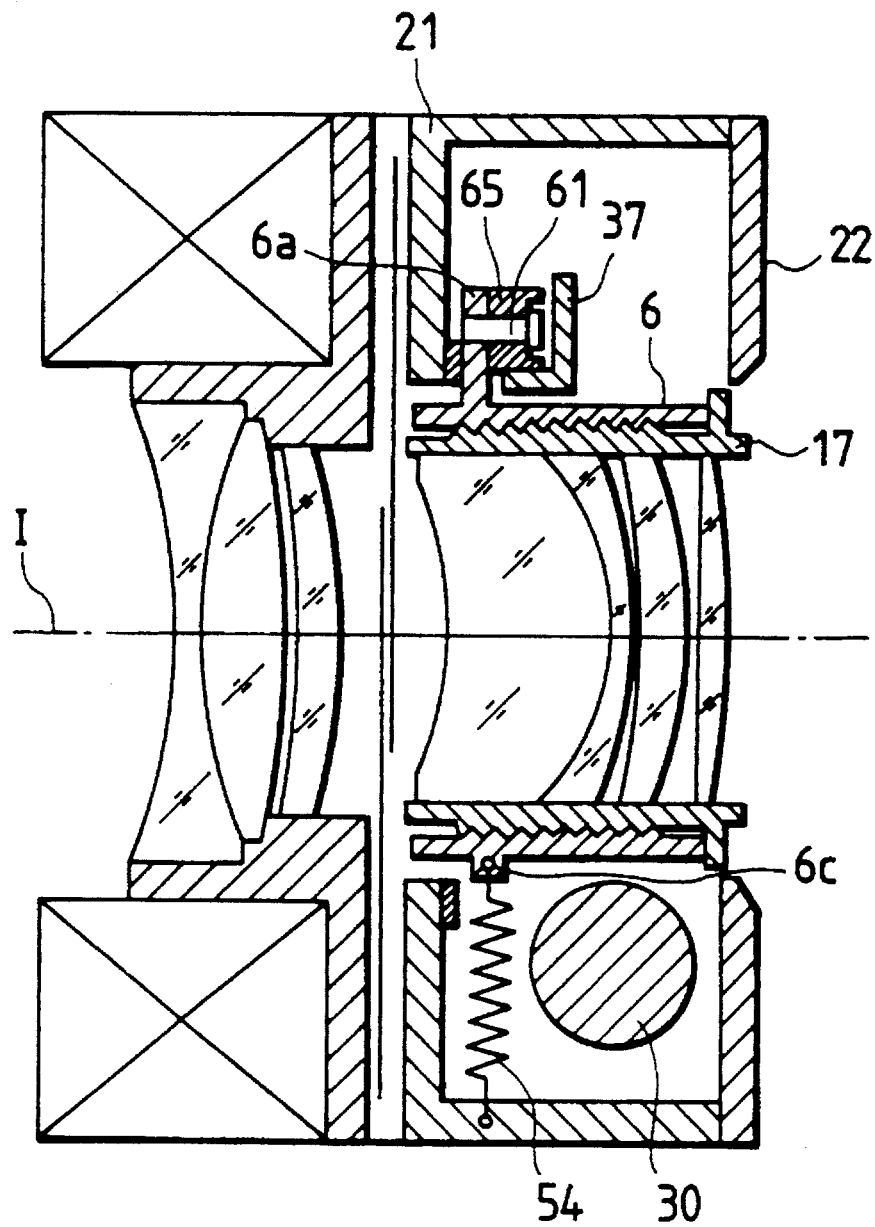
FIG. 3 is a cross-sectional view taken along the line III—III of FIG. 1.
Figure 4:
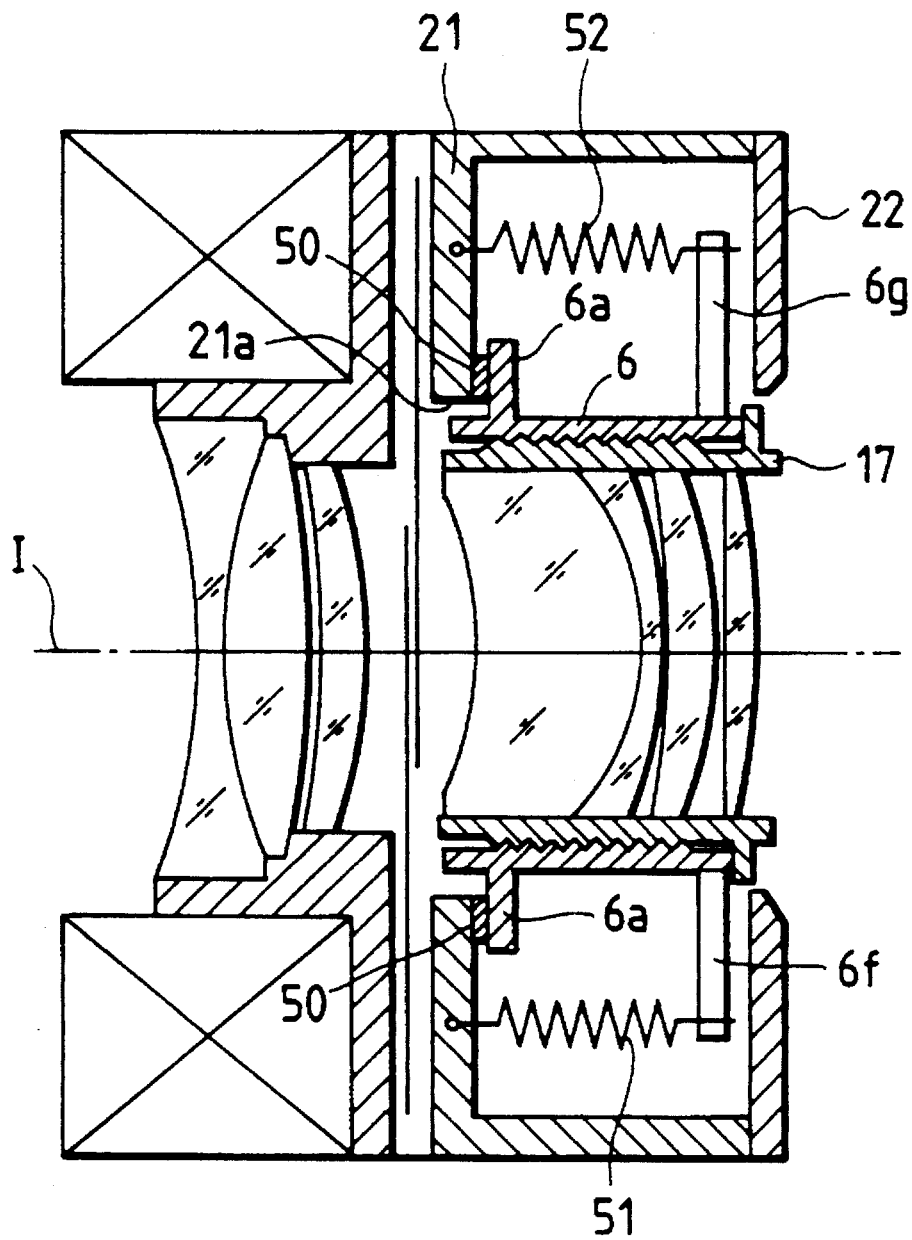
FIG. 4 is a cross-sectional view taken along the line IV—IV of FIG. 1.

Rollers 59, 60, 61 and 62 are mounted on the flange portion 6a of the lens frame 6 for rotation by roller shafts 63, 64, 65 and 66, respectively, and between the spring-securing portion 6b of the lens frame 6 opposite to the rollers 59 and 60, the spring-securing portion 6c of the lens frame 6 opposite to the rollers 61 and 62 and the base plate 21, springs 53 and 54 are extended substantially in the same directions as x-axis direction and y-axis direction which are the directions of movement of the movable members 36 and 37 (see FIGS. 1 and 3).

The rollers 59, 60 and 61, 62 bear against contact portions 36b, 36c or 37b, 37c of substantially L-shaped cross-section at the fore ends of both of the movable members 36 and 37 by the biasing forces of the springs 53 and 54.

Accordingly, the above-described vibration preventing lens 8 shifts following in the direction of movement (x-axis direction) of the movable member 36 by the motor 30 on x-axis side, but becomes free in y-axis direction. Also this vibration preventing lens 8 likewise shifts following in the direction of movement (y-axis direction) of the movable member 37 by the motor 31 on y-axis side, but becomes free in x-axis direction. Thus, this vibration preventing lens 8 can shift in every direction within the opening 21a in the base plate 21.

Also, by the springs 53 and 54, the lens frame 6 is biased substantially in the same directions as x-axis direction and y-axis direction which are the directions of movement of the movable members 36 and 37, whereby the lens frame 6 bears against the movable members 36 and 37 at all times and thus, the movement of the movable members 36 and 37 can be reliably transmitted to the lens frame 6.

Further, by the biasing forces of the springs 53 and 54, the thrust back-lash of the shafts 34 and 35 and the back-lash of the threadedly engaged portions between the externally threaded portions 34a and 35a of the shafts 34 and 35 and the internally threaded portions 36a and 37a of the movable members 36 and 37 can be secured always in the respective biasing directions. Accordingly, the drive forces of the respective motors 30 and 31 can be accurately and reliably transmitted to the vibration preventing lens 8.

Figure 5:
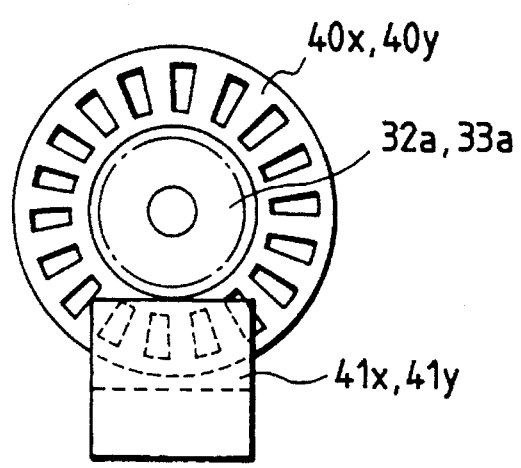
FIG. 5 is an enlarged view illustrating the essential portions of position detecting mechanism for a vibration preventing lens.

The detection of the position and speed of the above-described vibration preventing lens 8 may be effected by detecting the angles of rotation of the motors 30 and 31 on x-axis side and y-axis side, respectively, by apertured discs 40x and 40y provided integrally with the gears 32a and 33a shown in FIGS. 1 and 5 and formed with a number of apertures at equal intervals in the marginal edge portions thereof, and photointerrupters 41x and 41y provided on the base plate 21 side at the opposite sides of said marginal edge portions. That is, the numbers of the apertures in the discs 40x and 40y are detected as pulse signals by the photointerrupters 41x and 41y and the pulse signals are counted, whereby the detection of the position and speed of the vibration preventing lens 8 can be accomplished.

While in this embodiment, the drive forces of the motors 30 and 31 are transmitted to the movable members 36 and 37 through a screw mechanism, this is not restrictive, but a mechanism for converting rotational movement into linear movement, for example, a cam mechanism or a mechanism using a lever or the like is also applicable.

Figure 7:
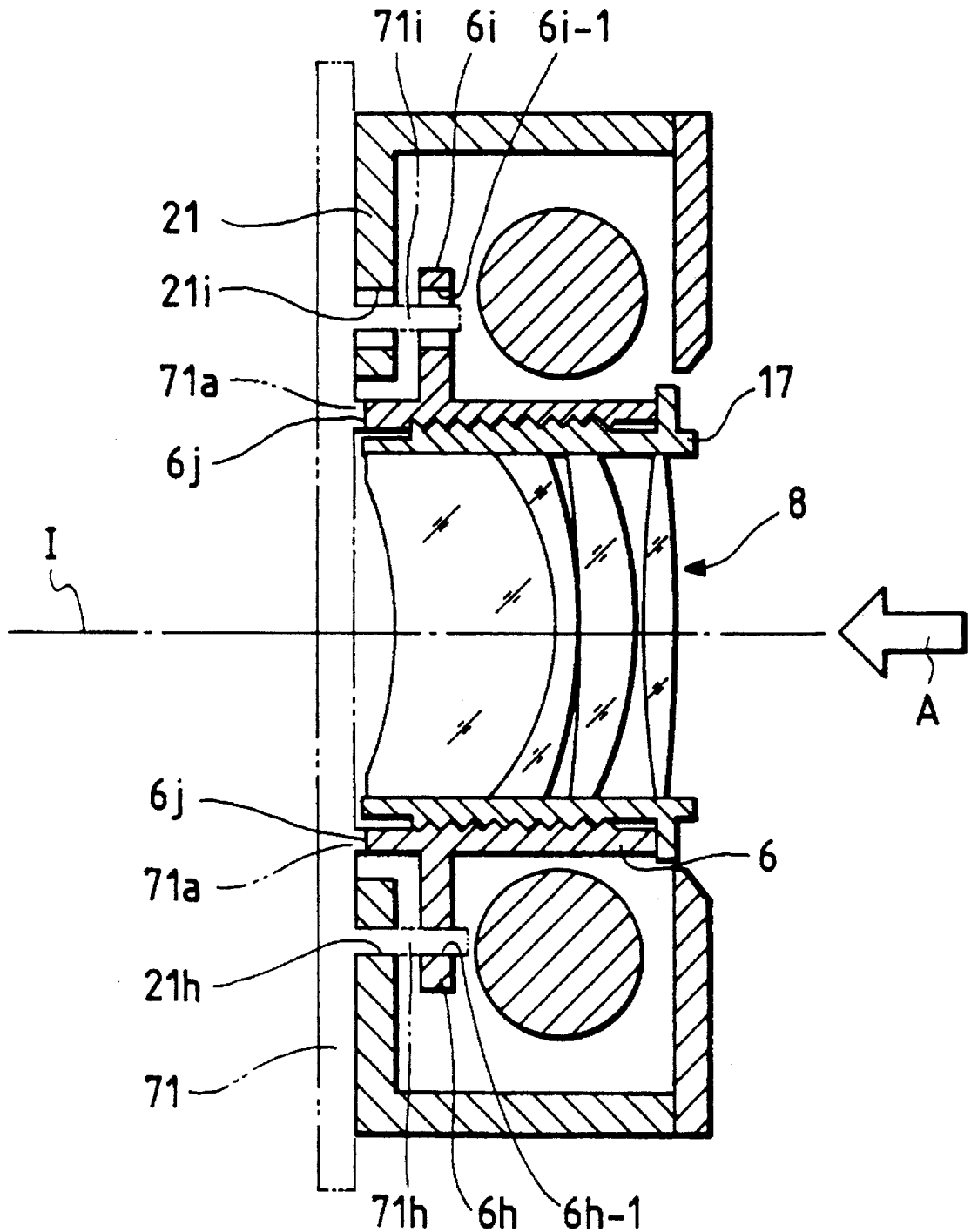
FIG. 7 is a cross-sectional view taken along the line V—V of FIG. 1.

FIG. 7 is a cross-sectional view taken along the line V—V of FIG. 1. The lens frame 6 is provided with protruding portions 6h and 6i in the radial direction of the outer periphery thereof. These protruding portions 6h and 6i are formed with apertures 6*h*-1 and 6*i*-1, respectively. As shown in FIG. 1, the aperture 6*h*-1 is a substantially circular aperture and is for fixing and positioning the lens chamber 17 by engaging a jig 71 when the lens chamber 17 is mounted on the lens frame 6. Also, the aperture 6*i*-1 is a radially elongated aperture and is for preventing a relative rotation between the lens frame 6 and the base plate 21.

On the base plate 21 side, a positioning aperture 21*h* and a relative rotation preventing aperture 21*i* are formed at locations corresponding to the apertures 6*h*-1 and 6*i*-1 in the lens frame 6.

The jig 71 is used to mount the lens chamber 17 on the lens frame 6, and is provided with an annular projection 71*a* and pin-like projections 71*h* and 71*i*, as indicated by dots-and-dash lines in FIG. 7. The projection 71*a* is for bearing against the end surface 6*j* of the lens frame 6 and receiving a force in the direction of arrow A when the lens chamber member 17 is mounted on the lens frame 6. The projection 71*h* is engaged with the aperture 6*h*-1 in the lens frame 6 and the aperture 21*h* in the base plate 21 and is used for fixing and positioning. The projection 71*i* is engaged with the aperture 6*i*-1 in the lens frame 6 and the aperture 21*i* in the base plate 21 of the vibration preventing mechanism portion 21 and is used for preventing the relative rotation between the base plate 21 and the lens frame 6.

As described above, the lens frame 6 and the lens chamber 17 are discrete members and therefore, when the size of the lens 8 changes, only the lens chamber 17 is changed, whereby the lens frame 6 and the vibration preventing mechanism portion 20 are not affected. Also, when the lens 8 is damaged, the interchange and adjustment of the lens can be effected easily.

Figure 8:
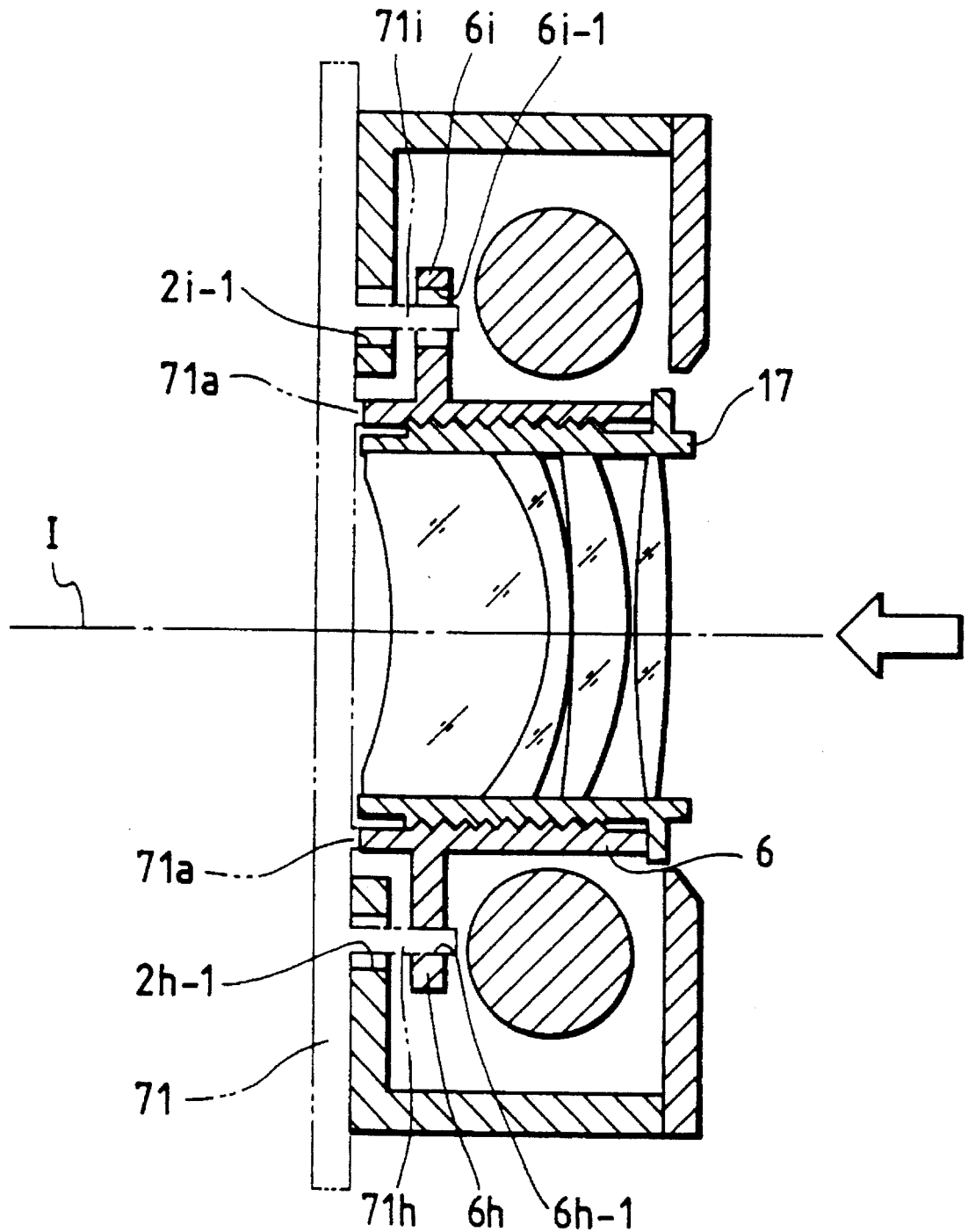
FIG. 8 is a cross-sectional view (corresponding to the cross-section V—V of FIG. 1) showing a portion of a second embodiment of the vibration preventing device of the present invention.

FIG. 8 is a cross-sectional view (corresponding to the cross-section V—V of FIG. 1) showing portions of a second embodiment of the vibration preventing device of the present invention. In the embodiment which will hereinafter be described, portions functionally similar to those in the aforedescribed first embodiment are given the same reference characters and need not be described.

In the first embodiment, design is made such that the lens frame 6 and the base plate 21 can be positioned at a time, while in the second embodiment, the base plate 21 is formed with apertures 21*h*-1 and 21*i*-1 of sufficiently large diameters relative to the projections 71*h* and 71*i* of the jig 71, and the lens chamber 17 is fixed and positioned on the lens frame 6, and it becomes possible to mount the lens chamber member 17 more simply.

As described in detail above, according to the present invention, the lens chamber member and the lens frame are discrete parts and therefore, it becomes easy to cope with other types of device as is required by the changes of the design and specification of the lens, and each part can be endowed with versatility.

Also, the lens frame is provided with an engagement portion engageable with the assembly jig and therefore, fixing or positioning can be effected easily and highly accurate assembly is possible.

What is claimed is:

1. A vibration preventing device comprising:

a vibration preventing optical system movable for the prevention of vibration;

a vibration preventing mechanism portion;

a holding member for fixedly holding said vibration preventing optical system; and a frame member for mounting said holding member on said vibration preventing mechanism portion;

said frame member and said holding member being separably coupled together.

2. A vibration preventing device according to claim 1, wherein said frame member has an engagement portion engaged with an assembly jig to effect fixing and/or positioning.

3. A vibration preventing device according to claim 1, wherein a portion of said vibration preventing mechanism portion has an engagement portion engaged with an assembly jig to effect fixing and/or positioning.

* * * * *